Figures 1, 2:
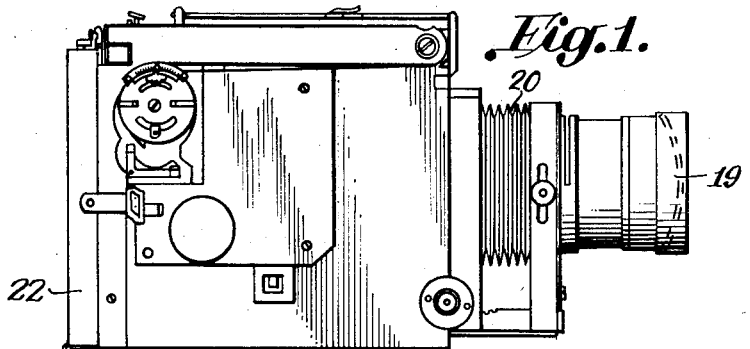

July 18, 1939.　　　　A. D. JOHNSON　　　　2,166,471
REFLEX CAMERA
Filed April 12, 1937　　　3 Sheets-Sheet 1

Inventor.
Alpheus D. Johnson
By:- M. Y. Charles
Attorney.

July 18, 1939.  A. D. JOHNSON  2,166,471
REFLEX CAMERA
Filed April 12, 1937   3 Sheets-Sheet 2
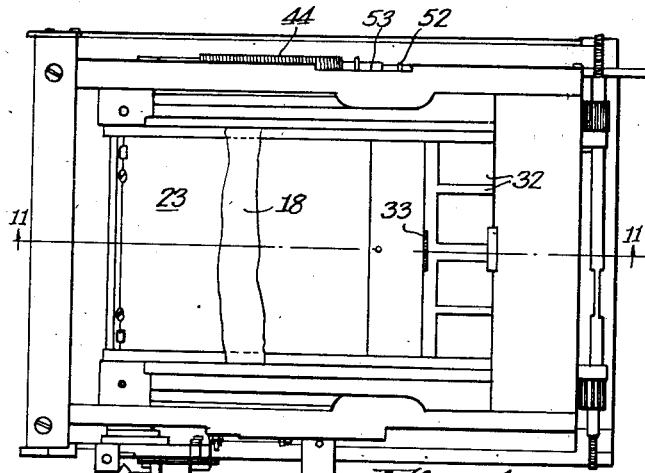
Fig. 4.
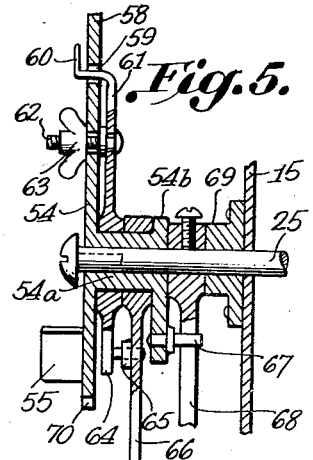
Fig. 5.
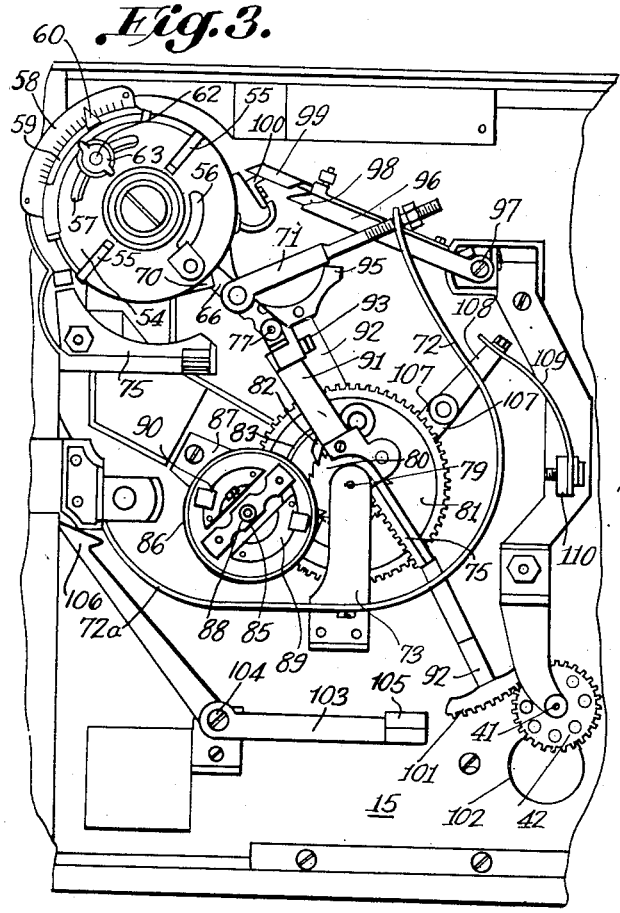
Fig. 3.
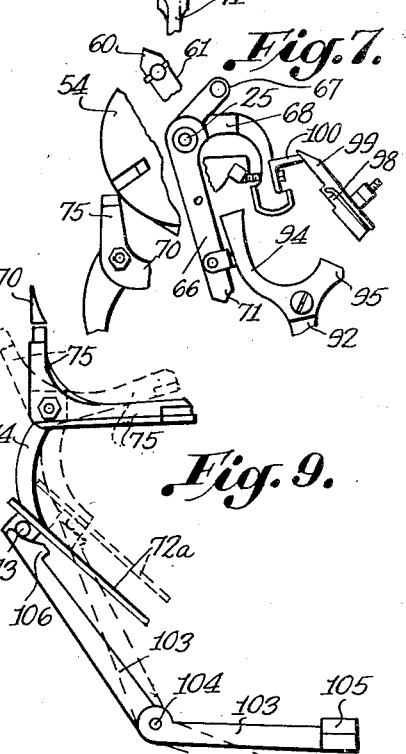
Fig. 7.
Fig. 9.
Inventor.
Alpheus D. Johnson
By:- M. Y. Charles
Attorney.

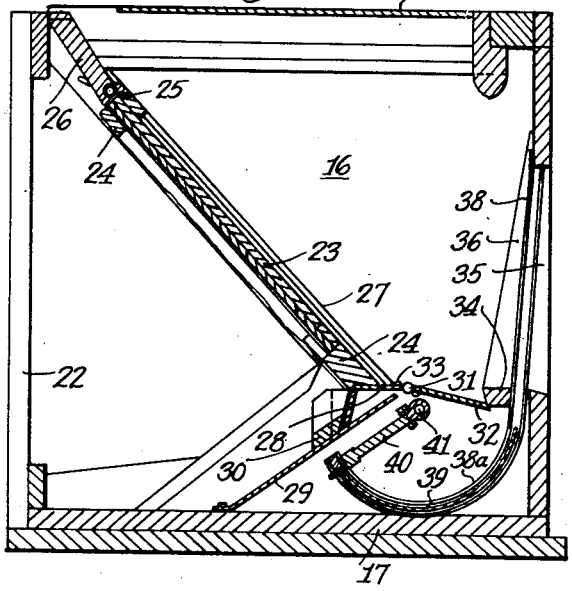
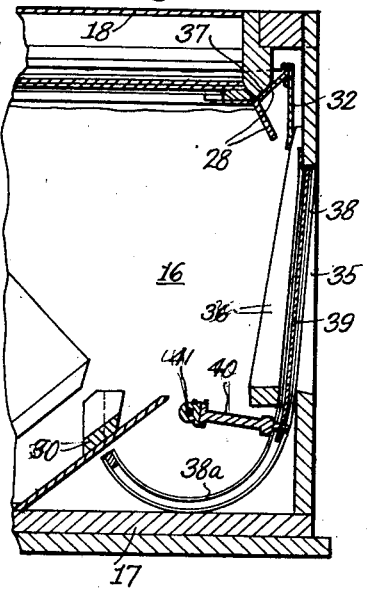
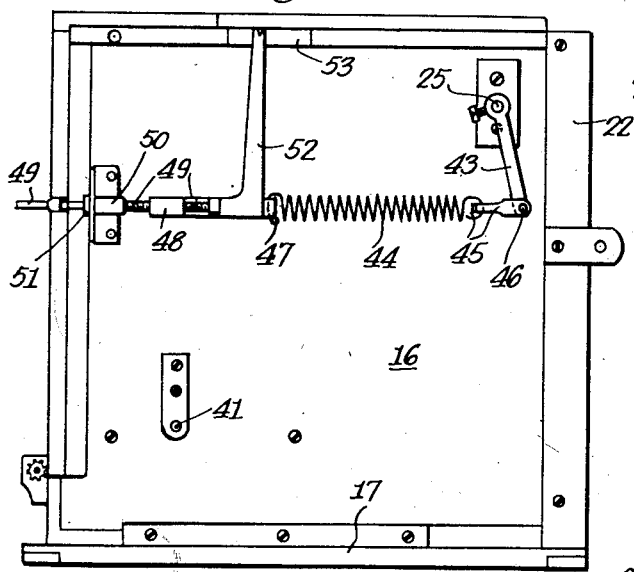
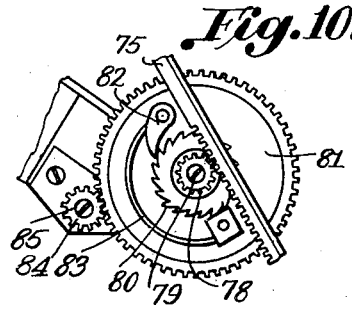

Patented July 18, 1939

2,166,471

UNITED STATES PATENT OFFICE 2,166,471

REFLEX CAMERA

Alpheus D. Johnson, Wichita, Kans., assignor of one-half to Martin J. Welsh, Kansas City, Mo.

Application April 12, 1937, Serial No. 136,409

4 Claims. (Cl. 95—57)

My invention relates to an improvement in reflex cameras.

The object of this invention is to provide a reflex camera in which the mirror element is a part of the shutter mechanism. Another object is to provide a reflex camera in which the closing curtain travels in the same direction as the mirror element so that an opening the full width of the camera is provided so that equal exposure of light is made the full width of the light sensitive plate.

A further object is to provide a reflex camera of the kind mentioned in which the space of time between the opening of the mirror element and the closing of the curtain may be finely adjusted.

Another object is to provide a reflex camera of the kind mentioned, in which the shutters may be timed or set after the slide is withdrawn from the plate or film holding device without exposing the sensitive plate.

Another object is to provide a camera of the kind mentioned in which the shutters operate in a positive light tight relationship to the walls of the camera.

These and other objects will be more fully explained as this description progresses.

Now referring to the accompanying drawings. Fig. 1 is a side view of my improved reflex camera, the camera being folded for carrying purposes. Fig. 2 is a side view of a portion of the camera having the cover plate removed therefrom and showing the mechanism employed in operating the several parts of the camera, the mechanism being set in such a position that the shutters are set for making an exposure. Fig. 3 is in the position assumed after the exposure has been made. Fig. 4 is a plan view of the camera, parts being removed and broken away for convenience of illustration. Fig. 5 is a detail sectional view taken along the line 5—5 in Fig. 2. Fig. 6 is a detail view of the time pointer arm and associated parts. Fig. 7 is a detail view of the several parts of the timing device, and the operating mechanism for the mirror shutter and for releasing the closing shutter at the right instant, the mechanism being shown in the released position. Fig. 8 is a side view of the same parts shown in Fig. 7, except that they are in the set position. Fig. 9 is a detail of the trip mechanism for the shutter mechanism. Fig. 10 is a detail of the governing device for timing the shutter. Fig. 11 is a sectional view through the camera, the section being taken along the line, 11—11 in Fig. 4, the shutters being closed and in a position ready to expose the light sensitive plate. Fig. 12 is a sectional view through the front shutter portion of the camera, the view being taken along the line 11—11 in Fig. 4, and the shutters being in the position following the exposure of the light sensitive plate. Fig. 13 is a side view of the opposite side of the camera from that shown in Fig. 2, the side plates being removed to show the working parts of the camera. Fig. 14 is a detail sectional view of the light tight joint between the mirror shutter element and the side walls of the camera.

Similar numerals of reference designate the same parts throughout the several figures of the drawings.

In the drawings is shown my improved reflex camera which comprises a box like element of the usual type having side walls 15 and 16, bottom 17 and an open top which is covered with a ground glass 18. The front of the camera is provided with the usual lens element 19, bellows 20, and adjustable mechanism for focusing the lens, and at the rear of the camera is the usual film or plate holder 22.

In the box like element is the mirror element 23, carried in the frame element 24, that is rigidly mounted on a shaft 25, that is pivotally mounted in the side walls 15 and 16, of the camera, one end of the shaft 25 projecting through the walls 15 and 16 of the camera for purposes that will be later described.

At 26 is a frame element within the box and spanning between the walls 15 and 16, said element extending from the top of the box towards the shaft 25 and terminating in a flexible light tight joint between the elements 26 and the mounting of the frame 24 on the shaft 25.

The side elements of the frame 24 are provided with a soft covering such as a piece of velvet or wool cloth 21 that will engage the side walls 15 and 16 sufficiently to prevent the passage of light thereby and still allow the free swing of the frame 24 within the box.

On the lower end of the frame 24 is a V-shaped element 28, one side of which slides over the upper edge of a shield element 29 and rests against a stop element 30 that is positioned on the shield element 29. The other edge of the element 28 is hingedly attached at 31 to a light shield element 32, which is urged in an anti-clockwise direction by a spring 33, the outer end of the shield 32 projects beneath a cross bar 34 which is positioned at the bottom of the opening 35 so as to further preserve the light tight quality of the camera. At the ends of the cross bar 34 and at the sides of the opening 35 is a tapering element 36, along which the ends of the light shield 32 will slide as the mirror shutter element 24 swings up or down to open the exposure opening 35 or to reset the shutter and frame therefor preparatory for the exposure of the light sensitive plate.

When the mirror element 24 swings to its raised position, the upper side of the V-shaped element 28 engages a V-shaped cross member 37, whereby a light tight joint is effected between the outer end of the mirror shutter element 24 and the front portion of the camera.

At either side of the opening 35 is a track element 38, which terminates in a curved formation 38a at a point below the opening 35. In the track element 38 is a flexible curtain element 39, the lower end of which is attached to the outer end of arm elements 40, which are rigidly mounted on a shaft 41, in such a manner that when the shaft 41 is revolved, the curtain 39 will be pushed upwardly in the track 38 to close the opening 35. One end of the shaft 41 extends through the side wall 15 of the camera and on the end of the shaft 41 is a gear wheel 42, the object of which will be later explained.

On the shaft 25 and on the outside of the wall 16 is a lever arm 43, one end of which is rigidly mounted on the shaft 25. At 44 is a helical spring, which is carried in a mounting 45 that is pivotally attached at 46 to the lower end of the lever arm 43. The other end of the spring 44 terminates in a socket element 47 which is provided with an extending portion 48 that is provided with a threaded hole to receive a threaded shaft 49, the shaft 49 is also revolvably carried in a bearing 50 that is rigidly attached to the wall 16 of the camera. The shaft 49 is also provided with a shoulder 51 which rests as a thrust bearing against the bearing element 50, so that by turning the shaft 49 the elements 47 and 48 are moved to tighten or loosen the tension of the spring 44.

At 52 is an indicating arm which is rigidly attached to the elements 47—48 extending upwardly therefrom, so that by looking downwardly on the camera as in Fig. 4, the end of the arm 52 will be seen in the notch 53 as an indicator of the tension 44.

The object of the spring 44 is to pull the lever arm 43 so as to revolve the shaft 25 to raise the mirror shutter element 24 from the position shown in Fig. 11 to that shown in Fig. 12.

On the other end of the shaft 25 is the timing device, which comprises, preferably a disc 54 which is revolvably mounted on the shaft 25. The disc 54 is provided with ear like elements 55 by which the disc 54 may be revolved. In the disc 54 is a pair of curved slots 56 and 57. The disc 54 is also provided with a graduation reading plate 58, which is provided with a curved slot 59, through which projects a pointer element 60, which indicates the interval of time that is to be allowed between the opening of the mirror shutter element 23—24 and the closing of the curtain shutter element 39. The pointer 60 is mounted on a pointer arm 61, in which is rigidly mounted a threaded stud 62 which passes through the curved slot 57 and is provided with a wing clamp nut 63, whereby the pointer arm 61 may be revolved behind the disc 54 to adjusted positions and the disc 54 and the pointer arm 61 may then be locked together by tightening the wing nut 63 on the stud 62.

It will be understood that the pointer arm 61 is revolvably mounted on the sleeve portion 54a which is integral with the disc 54. At 64 is an element extending from the bearing of the pointer element 61 which is adapted to engage a pin 65 that is rigidly mounted on a lever element 66 which is also revolvably mounted on the sleeve element 54a.

The sleeve element 54a is provided with a flange element 54b which is provided with an extension on which is rigidly mounted a pin 67. The pin 67 is adapted to engage a lever arm 68, which is rigidly mounted on the shaft 25, which is revolvably carried in a bearing 69 that is rigidly attached to the side wall 15 of the camera. The disc 54 is provided with a projecting catch element 70. At 71 is a link element that is pivotally attached to the lever arm 66, the outer end of which adjustably engages a leaf spring 72, which is rigidly attached to a bearing support element 73 which is rigidly attached to the wall 15 of the camera, and the spring continues as a portion or end 72a and rests against a pin 73 which is rigidly mounted on a lever arm 74 which is rigidly connected to an L-shaped trip lever 75, the upper end of which engages the catch element 70 on the disc 54 so that the disc 54 may be turned in a clockwise direction, thereby rocking the arm carrying the pin 67 so that the pin 67 will engage the arm 68 and thereby rotate the shaft 25 so as to drop the mirror shutter element 23—24 to the lowered position as shown in Fig. 11, and at the same time the catch element 70 on the disc 54 will pass the end of the L-shaped trip lever 75 so as to hold the disc and the mirror shutter element in the positions shown in Fig. 11 and Fig. 2. At 76 is a gear rack which is pivotally connected at 77 to the lever arm 66. The rack 76 engages a gear wheel 78 which is revolvably mounted on a stud 79, one end of which is rigidly mounted on the wall 15, and the other end is carried in a bearing on the bearing bracket 73. Rigidly attached to the gear wheel 78 is a ratchet wheel 80, which is revolvably mounted over a gear wheel 81 that is also revolvably mounted on the stud 79. The wheel 81 is provided with a pawl 82, that is pivotally mounted on the wheel 81, and is adapted to engage the teeth on the ratchet wheel 80 by reason of the urge of a spring 83 that is rigidly attached to the wheel 81, so that the ratchet wheel 80 will drive the gear wheel 81 in a clockwise direction but not in an anti-clockwise direction. At 84 is a small pinion that is rigidly mounted on a shaft 85, the pinion 84 being in mesh with the gear 81, so that as the gear 81 revolves it will drive the gear 84 and the shaft 85. The shaft 85 is revolvably carried in a bearing which is a part of a brake drum 86 that is carried on a support element 87 which is rigidly attached to the sidewall 15 of the camera. Within the brake drum element 86 is a cross arm 88 which is rigidly mounted on the shaft 85. In the brake drum 86 is a pair of brake shoes 89 and 90. One of each brake shoe being pivoted to the outer ends of the cross arm 88, so that as the cross arm is revolved the brake shoes will engage the brake drum by reason of centrifugal force. This device provides a governor which controls the speed with which the wheel 81 may revolve.

The gear rack 76 is carried in a slide guide 91, which is pivotally mounted on the stud 79, the object of which will be later described.

At 92 is a lever element that is also pivotally mounted on the stud 79. The upper end of the lever element 92 is provided with an outwardly projecting element 93, the object of which will be later explained, and on the upper end of the lever element 92 is a bifurcated element having the parts 94 and 95, the object of which will also be latter explained.

At 96 is a stop latch element that is pivotally mounted at 97 on a pin that is rigidly mounted on the wall 15 of the camera, the other end of the element 96 is provided with a notch 98, which is adapted to receive and hold the element 95 against rotary movement about the point 97. The element 96 is also provided with a support element 99, which is adapted to engage an L-shaped element 100 on the arm 68.

On the lower end of the lever 92 is a gear segment 101, which is in mesh with a gear wheel 42, that is rigidly mounted on the shaft 41, which carries the operating levers 40, that operate the shutter curtain 39.

At 103 is a release lever that is pivotally mounted at 104 on the wall 15 of the camera. On one end of the release lever 103, is a thumb release element 105. On the other end of the release lever 103 is a bevel ended element 106, which engages the pin 73 for purposes that will be later described.

At 107 is a lever arm which is an integral part of the lever arm 92 and at 108 is a link element, one end of which is pivotally attached to the lever arm 107 and the other end engages a spring 109, which is rigidly mounted at 110 on an element that is supported by the wall 15 of the camera. The spring 109 is so tensioned as to push on the end of the link 108, the object of which will be later described.

The operation of my improved camera is as follows. The light sensitive plate is positioned in the plate holder 22 and the slide may be removed from the plate holder to expose the plate to the interior of the camera, then the disc 54 is rotated in a clockwise direction, whereupon the lip element 64 engages the pin 65 to swing the arm 66, also in a clockwise direction and the pin 67 will engage the lever arm 68, whereby the lever arm 68 will also be swung in a clockwise direction, thereby revolving the shaft 25 and swinging the reflector shutter element 23—24 to the down position as shown in Fig. 11, and simultaneously with this action, the gear rack 75 is drawn to the position shown in Fig. 2, whereupon the catch 70 engages the latch 75 to hold the several parts in the position just described.

At the time the reflector shutter element 23—24 and the rack gear 75 are set as just described, the lever arm 68 engages the element 94 on the lever 92 whereby the lever 92 is rocked to the position shown in Fig. 2, thereby rotating the gear wheel 42 in a clockwise direction which pulls the shutter curtain 39 downwardly in the track 38—38a to open the opening 35, and the spring 109 will push on the link 108 to push the levers 107 and 92 to retain the shutter curtain 39 in the open position.

The exposure is now ready to be made, and is accomplished by pressing downwardly on the thumb release 105, whereupon the element 106 pushes the pin 73 in an anti-clockwise direction against the spring 72a whereby the levers 74 and 75 are pushed to the dotted position shown in Fig. 9, whereupon the end of the lever 75 is removed from under the catch element 70 on the disc 54, whereupon the disc 54 and its associated parts are permitted to revolve anti-clockwise and upon the release of the disc 54, the spring 44 will instantly pull the lever 43 to rotate the shaft 25 so as to raise the reflector element 23—24 to the raised position as shown in Fig. 12, whereupon the sensitive plate is exposed to the light coming through the entire space of the opening 35.

Simultaneously with the movement of the reflector element 23—24 the arm 64 disengages the pin 65 to release the lever arm 66, whereupon the spring 72 pulls the arm 66 in a clockwise direction to revolve the wheel 81 in a clockwise direction. The speed of the wheel 81 is retarded by the governor device on the shaft 85, so that the movement of the arm 66 is slow and as the arm 66 revolves the rack housing 91 will engage the lip element 93 on the lever element 92.

Prior to the time the element 91 engages the lip element 93, the element 100 on the lever element 68 engaged and raised the element 99—96 so as to release the lever element 92 for movement, so that as the rack housing element 91 advances, it will engage the stop 93 and rock the levers 92 and 107 to a point where the pivot point 107a passes the center line between the stud 79 and the outer end of the link 108 whereupon the pressure of the spring 109 speeds the movement of the lever 92 in excess of the movement imparted to that lever by the rack housing 91. This movement is released from the control of the governor by reason of the pawl and ratchet device above described and the movement of the lever 92 is practically instantaneous.

When the lever 92 is rocked, the gear segment 101 revolves the gear 42 to operate the shutter curtain as previously described.

Attention is called to the fact that there has been a considerable interval of time between the raising of the reflector shutter 23—24 and the closing of the shutter curtain 39 which has allowed time for slow exposure of the light sensitive plate.

Now the device may be adjusted to govern any interval of time from a slow exposure to an instantaneous exposure. This adjustment is made as follows: The wing nut 63 is loosened so that the lever arm 61 may be moved in an anti-clockwise direction, whereupon the lever 66 is moved to a position where the rack guide 91 engages or nearly engages the lip 93. Therefore when the disc 54 is released, the reflector shutter element 23—24 immediately raises to the raised position shown in Fig. 12 and the lever arm 91 is immediately swung so as to immediately close the shutter curtain 39 and thereby an instantaneous exposure of the light sensitive plate has been accomplished.

Intermediate intervals of time for exposing the light sensitive plate may be accomplished by positioning the lever 61 and pointer 60 at any desired point between the instantaneous action and the slow action.

Such modifications may be employed as lie within the scope of the appended claims without departing from the spirit and intention of the invention. Now having fully described my invention, what I claim as new and desire to secure by Letters Patent is:

1. In a reflex camera, said camera having an opening shutter that is swingably mounted in said camera and rigidly mounted on a revolvable shaft, and a closing curtain in said camera that is operable from a second revolvable shaft, a mechanism for revolving the first said shaft so as to open the camera at the beginning of a predetermined interval of time, and for revolving the second said shaft at the end of the said predetermined interval of time so as to close the camera, and adjustment means in said mechanism for governing the length of time between movements of said shafts for the opening and closing movement of said shutter and curtain.

2. In a reflex camera, said camera having an opening shutter that is swingably mounted in said camera and rigidly mounted on a revolvable shaft, and a closing curtain in said camera that is operable from a second revolvable shaft, a mechanism for revolving the first said shaft so as to open the camera at the beginning of a predetermined interval of time, and for revolving the second said shaft at the end of the said predetermined interval of time so as to close the camera, and adjustment means in said mechanism for governing the length of the interval of time between movements of said shafts for the opening and closing movement of said shutter and curtain, said mechanism for revolving said shafts comprising a spring tensioning means for revolving the first said shaft so as to swing the said opening shutter to open the camera, a lever rigidly mounted on the first said shaft, and a hubbed disc revolvably mounted on the first said shaft, the hub of said disc having a pin thereon that overlaps the said lever so as to engage the said lever and rotate the first said shaft against the spring tension upon the turning of said disc, a releasing catch element, and means on said disc for holding the said disc and the first said shaft against rotation urged by said spring tension therefor; a gear wheel rigidly mounted on the second said shaft, and a gear segment in mesh therewith, said gear segment being carried on one end of a T-shaped lever element that is pivotally mounted at the juncture of the T-formation at a point intermediate the first and second said shafts, the opposite end of the T-head being bifurcated, a releasable stop element, said stop element engaging one of said bifurcations so as to hold the T-shaped lever and associated parts in such a position that the curtain shutter is held in an open position in the camera, and spring means engaging the leg of said T-shaped lever to also maintain the open position of said curtain shutter, the outer end of the first said lever element being adapted to engage the other bifurcation of the said T-shaped lever for actuating purposes of the T-shaped lever and also to engage the said stop element for releasing the T-shaped lever for movement thereof, said T-shaped lever having a stop element thereon for engagement of another actuating element for said T-shaped lever, a third lever element, said third lever element being revolvably mounted on the hub of the said disc, and means intermediate the third said lever and the said disc for adjustably stationing the third said lever relative to the fixed position of the said disc, and spring means for urging the outer end of the third said lever to swing toward the T-shaped lever, a rack element, said rack element being slidably carried in a guide element that is pivotally mounted at the same point as that of the T-shaped lever, one end of said rack being pivotally connected to the outer end of the third said lever so that as the outer end of the third said lever swings toward the T-shaped lever the guide element will engage the stop element on the T-shaped lever so as to move the T-shaped lever which movement is spring accelerated to close the curtain shutter element.

3. In a reflex camera as defined in claim 2, and means for governing the speed with which the third said lever moves.

4. In a reflex camera as defined in claim 2, and means for governing the speed with which the third said lever moves, said governing means comprising a pinion that is revolvably mounted at the same point as the said T-shaped lever, said pinion being rigid with a ratchet wheel that is concentrically positioned with a gear wheel on which is mounted a spring actuated ratchet dog that will engage the teeth of the ratchet wheel so that the ratchet wheel will drive the said gear wheel, the said pinion being in mesh with the said rack so that the rack will drive the pinion, ratchet and associated gear wheel upon the movement of said rack and third said lever, a second pinion, said second pinion being in mesh with the second said gear wheel and being rigidly mounted on a shaft, a brake drum, said brake drum being rigidly mounted on the frame work of the camera and revolvably carrying the shaft on which the second said pinion is mounted, brake shoes, said brake shoes being positioned within said brake drum and pivotally carried on a mounting on the shaft carrying the second said pinion so that as the shaft and brake shoes revolve the brake shoes will be thrown against the brake drum so as to rub on the brake drum and retard the speed of the shaft and gear train up to and including the said rack and lever attached thereto.

ALPHEUS D. JOHNSON.